United States Patent Office 2,980,622
Patented Apr. 18, 1961

2,980,622

STABILIZED TRICHLOROCYANURIC ACID COMPOSITIONS

William F. Symes, Winchester, Mass., assignor to Monsanto Chemical Company, St. Louis, Mo., a corporation of Delaware No Drawing. Filed Apr. 23, 1956, Ser. No. 579,711

12 Claims. (Cl. 252—99)

The present invention relates to compositions comprising trichlorocyanuric acid and alkaline alkali metal salts, and relates particularly to compositions of these ingredients which have improved resistance to loss of available chlorine in the presence of moisture and can be used for bleaching, disinfecting, sterilizing, detergent and other purposes.

Dry or substantially dry compositions consisting essentially of trichlorocyanuric acid and alkaline alkali metal salts such as alkaline alkali metal phosphates and/or combinations of these with wetting agents and/or synthetic detergents such as, for example, sodium salts of long chain alkyl sulfates and sodium salts of alkylated benzene sulfonic acids are described in U.S. Patent No. 2,607,738 to Edgar E. Hardy, issued August 19, 1952. As is pointed out in this patent the compositions or mixtures are quite stable when dry and may be stored for long periods of time. However, it has since been found that when such compositions contain even small amounts of moisture whether by accidental contamination or otherwise or by addition to water, the trichlorocyanuric acid tends to decompose and the compositions tend to lose available chlorine at a relatively rapid rate initially. This means that the moisture contaminated compositions contain less available chlorine than would be expected on the basis of the trichlorocyanuric acid initially present therein and consequently, under such circumstances, the compositions are usually deficient in available chlorine for the general purpose for which they were initially formulated. Contamination of the compositions with moisture may occur by mixing the ingredients in the presence of moisture without taking precautions to keep the ingredients in the dry state, or by storing the compositions, in home laundries for instance, in open containers or in containers which are not sufficiently tight to exclude moisture. Loss of available chlorine is also experienced if the compositions are added to water to form aqueous solutions which are left to stand for some period of time before use. Since the compositions may become contaminated by moisture in various ways with resultant loss in available chlorine when handled by customers and consumers who take little or no precautions in excluding moisture from the compositions, there is a definite need for compositions of the type described in which the loss of available chlorine is retarded, or which do not exhibit undue loss of available chlorine, when exposed to moisture.

It is, accordingly, one object of this invention to provide compositions containing trichlorocyanuric acid and alkaline alkali metal salts, which compositions have improved stability toward loss of available chlorine in the presence of moisture.

It is a further object of this invention to provide a composition comprising trichlorocyanuric acid and alkaline alkali metal phosphate salts, which composition is capable of releasing available chlorine in aqueous solutions for bleaching, sanitizing and other purposes and which exhibits improved stability toward loss of available chlorine during storage in the presence of moisture.

It is a further object of this invention to provide a composition comprising trichlorocyanuric acid and alkali metal carbonates, which compositions have improved stability toward loss of available chlorine in the substantially anhydrous state as well as in the presence of moisture.

Still further objects and advantages of this invention will become apparent from the following description and appended claims.

The present invention is based on the discovery that compositions comprising trichlorocyanuric acid and alkaline, water-soluble, alkali metal salts retain their original available chlorine content to a marked degree in the presence of moisture when they contain cyanuric acid or certain other organic compounds which are capable of being N-chlorinated. This discovery is particularly applicable to compositions containing in excess of 0.5% by weight of moisture, but is particularly applicable to solid and free-flowing compositions containing in excess of 1% by weight of moisture, as well as aqueous slurries or solutions of such compositions.

The trichlorocyanuric acid employed in the compositions of this invention has been described in the literature and has been referred to as possibly existing in the keto- and enol forms. In any event, the compound has a theoretical available chlorine content of 91.5%. The commercially available product containing between about 84 and 91.5% available chlorine can also be used. The term "available chlorine" as employed herein is used in its usual technical meaning as employed in the sodium hypochlorite art. The "available chlorine" in a given compound is determined by analyzing for the amount of chlorine that can be liberated from the compound by treatment with an aqueous acid solution.

A variety of alkaline, water-soluble, alkali metal salts can be used in the compositions of this invention, including, preferably, those inorganic salts which are employed as detergent builders. As examples of such salts may be mentioned tri-alkali metal phosphates such as trisodium phosphate and tripotassium phosphate; di-alkali metal hydrogen phosphates such as disodium hydrogen phosphate and dipotassium hydrogen phosphate; the alkaline, water-soluble molecularly dehydrated alkali metal phosphate salts such as the alkali metal pyrophosphates, for example, tetrasodium pyrophosphate, trisodium hydrogen pyrophosphate and tetrapotassium pyrophosphate, also the alkali metal tripolyphosphates such as sodium tripolyphosphate ($Na_5P_3O_{10}$) and potassium tripolyphosphate; the alkaline, water-soluble alkali metal meta phosphates such as sodium hexametaphosphate; the water-soluble alkali metal silicates such as sodium silicates having an $Na_2O$ to $SiO_2$ mol ratio of 1:1 to 1:3.6, preferably 1:1 to 1:3.5, and the corresponding potassium silicates; the water-soluble alkali metal borates such as calcined sodium tetraborate or borax; and the water-soluble alkali metal carbonates or bicarbonates such as sodium or potassium carbonates. The above salts can be used alone or in various combinations with each other or with water-soluble, neutral, inert diluents, which may also have some detergent building properties, for example, water-soluble, neutral, inert, alkali metal salt diluents such as neutral alkali metal sulfates or chlorides, for example, sodium sulfate or sodium chloride. The proportions of salts employed in the compositions of this invention can be varied considerably depending on the end use of the composition, but is usually in excess of 40% and up to 96% by weight of the dry solids content of the composition. Of this, the alkaline alkali metal salts usually comprise about 10 to 95% by weight of total salts, and the inert diluent salt usually is used in amounts of about 90 to 5% by weight of total salts.

Although the compositions of this invention consist essentially of trichlorocyanuric acid, cyanuric acid and the alkaline salts or combination thereof with inert diluent salts hereinbefore referred to, the compositions can also contain relatively minor amounts, usually less than 15% by weight on a solids basis, preferably 1 to 10% by weight, of anionic wetting agents or synthetic detergents such as those described in the above-mentioned Hardy Patent No. 2,607,738. Such agents are detergents include, for example, sodium salts of long chain alkyl sulfates, sodium salts of alkyl naphthalene sulfonic acids, sodium salts of sulfonated abietenes, sodium salts of alkyl benzene sulfonic acids, particularly those in which the alkyl group contains 8 to 16 carbon atoms, sodium salts of sulfonated mineral oils; and sodium salts of sulfosuccinic esters such as sodium dioctylsulfosuccinate.

The various ingredients referred to herein can be used in the compositions in various proportions depending on whether the composition is to be used as a bleaching composition, a disinfecting composition, a dishwashing composition, a detergent composition, etc. However, in general, the compositions will contain, on a dry basis, from about 0.5 to 40% by weight of trichlorocyanuric acid, about 0.1 to 1, preferably 0.3 to 0.7, mol of cyanuric acid per mol of trichlorocyanuric acid, from 0.05 to 10% by weight of anionic wetting agent, when used, and the remainder consisting substantially of alkaline alkali metal salts or combinations thereof with the inert diluent salts, and moisture, usually in amounts of 0.5 to 5% by weight. In the case of aqueous compositions, the ingredients are normally present in the composition on the same solids basis, but the compositions may contain from 50 to 99% by weight of water.

In a preferred embodiment of the invention, the compositions comprise, on a solids basis, from about 3 to 15% by weight of trichlorocyanuric acid, about 0.3 to 0.7 mol of cyanuric acid per mol of trichlorocyanuric acid, about 10 to 60% by weight of sodium tripolyphosphate or a mixture of such phosphate and sodium silicate, and the remainder consisting substantially of sodium sulfate. Such compositions are useful as commercial laundry bleaches and dishwashing compositions.

In another preferred embodiment of the invention, the compositions comprise, on a solids basis, about 3 to 15% by weight of trichlorocyanuric acid, about 0.3 to 0.7 mol of cyanuric acid per mol of trichlorocyanuric acid, about 10 to 60% by weight of sodium tripolyphosphate, about 0.1 to 5% by weight of anionic wetting agent, preferably sodium dodecyl benzene sulfonate, and the remainder consisting substantially of sodium sulfate. Such compositions are useful as household bleaches and sanitizers.

In still another preferred embodiment of the invention, the compositions comprise from about 3 to 15% by weight of trichlorocyanuric acid, from about 0.4 to 0.6 mol of cyanuric acid per mol of trichlorocyanuric acid, and the remainder consisting substantially of sodium carbonate or mixtures thereof with sodium tripolyphosphate. These compositions are useful as sanitizer detergents, particularly in cleaning and sanitizing food processing equipment and containers.

In most instances, the proportions and kind of ingredients in the formulation employed will depend on the purpose for which the formulation or composition is being used, that is, whether it is to be used for bleaching, sanitizing, dishwashing, etc. Irrespective of the use involved, however, the compositions containing cyanuric acid or some adequate substitute therefor have a definitely greater tendency to retain their original available chlorine content in the presence of moisture than corresponding compositions which do not contain the cyanuric acid or substitute.

A further understanding of the compositions of this invention will be obtained from the following specific examples which are intended to illustrate the invention but not to limit the scope thereof, parts and percentages being by weight unless otherwise indicated. In the following examples, the trichlorocyanuric acid used contained 90% available chlorine.

*Example 1*

Dry mixed compositions containing the following ingredients in the percentage given were prepared:

| Ingredient | Composition No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Trichlorocyanuric Acid | 11 | 11 | 11 | 11 | 11 | 11 | 11 | 11 | 11 | 11 | 11 | 11 |
| Cyanuric Acid | 0 | 0 | 0 | 0 | 0 | 0 | 3 | 3 | 3 | 3 | 3 | 3 |
| Sodium Tripolyphosphate | 30 | 20 | 0 | 0 | 20 | 0 | 30 | 20 | 0 | 0 | 20 | 0 |
| Tetrasodium Pyrophosphate | 0 | 0 | 30 | 20 | 0 | 0 | 0 | 0 | 30 | 20 | 0 | 0 |
| Anhydrous Sodium Metasilicate | 0 | 0 | 0 | 0 | 20 | 0 | 0 | 0 | 0 | 0 | 20 | 0 |
| Anhydrous Sodium Sulfate | 59 | 69 | 59 | 69 | 49 | 0 | 56 | 66 | 56 | 66 | 46 | 0 |
| Sodium Carbonate | 0 | 0 | 0 | 0 | 0 | 89 | 0 | 0 | 0 | 0 | 0 | 86 |

All of the compositions had substantially the same odor characteristics, namely only a slight chlorine odor, in the dry state in sealed containers. When compositions 1–12 contained 1% by weight of moisture, compositions 1–6 exhibited a stronger chlorine odor than compositions 7–12 after storage in sealed containers indicating some decomposition of the trichlorocyanuric acid due to the presence of small amounts of moisture in contrast to a lack of decomposition in compositions 7–12. When compositions 1–12 were slurried with water to form 50% solids slurries or concentrated solutions, the resulting aqueous products from compositions 1–6 exhibited a strong chlorine odor, whereas the resulting aqueous products from compositions 7–12 had a mild chlorine odor or were odorless.

All of the foregoing comparisons indicate that moisture tends to decompose compositions containing trichlorocyanuric acid and alkaline salts, whereas this decomposition is suppressed or inhibited or retarded when cyanuric acid is present in the compositions.

*Example 2*

Commercial anhydrous sodium carbonate was mixed with tricholorocyanuric acid and with mixtures of trichlorocyanuric acid and cyanuric acid in various mol ratios—as designated below—to provide compositions containing 8% available chlorine. These compositions were then stored in open or closed vials at different temperatures and for varying periods of time as indicated in the table below. At the end of the stated time intervals, the loss in percent of available chlorine from each composition was determined. The results are given below:

| Composition | Percent Available Chlorine Originally | Mol Ratio of Cyanuric Acid to Trichloro-cyanuric Acid | Percent Loss in Available Chlorine | | | | | |
|---|---|---|---|---|---|---|---|---|
| | | | At 100° C., After 20 Hours | | At 50° C., After 11 Days | | At 21° C. | |
| | | | Open Vial | Closed Vial | Open Vial | Closed Vial | After 7 Days, 65% Relative Humidity, Open Vial | After 11 Days, Closed Vial |
| 13 | 8 | 0 | 13.6 | 35.0 | 16.5 | 29.0 | 32.4 | 5.9 |
| 14 | 8 | 1:2 | 1.5 | 5.7 | 1.2 | 1.2 | 12.5 | 1.0 |
| 15 | 8 | 1:1 | 2.5 | 6.3 | 3.0 | 2.1 | 8.8 | 3.0 |
| 16 | 8 | 1:3 | 2.8 | 13.7 | 6.1 | 2.1 | 13.3 | 2.4 |
| 17 | 8 | 1:4 | 4.4 | 19.5 | 8.0 | 7.6 | 13.5 | 3.8 |
| 18 | 8 | 1:6 | 9.0 | 23.6 | | | | |

The optimum mol ratio of cyanuric acid to trichlorocyanuric acid for preventing loss of available chlorine under the above conditions is 1:2.

Example 3

The following compositions were first prepared in the dry state:

| Composition No. | Trichloro-cyanuric Acid | Cyanuric Acid | Sodium Tripoly-phosphate | Sodium Sulfate |
|---|---|---|---|---|
| 19 percent | 11 | 0 | 25 | 64 |
| 20 do | 11 | 3 | 25 | 61 |

Each composition was added separately to water to form a 50% solids slurry of each composition, and the slurries were placed in an oven and heated therein for 45 minutes at 110° C. After this the slurries were removed from the oven and analyzed for available chlorine. The slurry prepared from composition 20 contained 61% of the available chlorine originally present in the composition, whereas the slurry prepared from composition 19 only contained 29% of the available chlorine originally present in composition 19.

These results clearly indicate that the use of cyanuric acid under the conditions employed inhibits or minimizes loss of available chlorine to a substantial extent from the compositions containing trichlorocyanuric acid and an alkaline salt in the presence of moisture.

Example 4

The following compositions were prepared, the amounts employed being in parts by weight unless otherwise indicated, and allowed to stand for 3 days at room temperature, after which the loss in available chlorine of each composition was determined:

| Ingredients | Composition No. | | | | | |
|---|---|---|---|---|---|---|
| | 21 | 22 | 23 | 24 | 25 | 26 |
| Trichlorocyanuric Acid (TCCA) | .1287 | .1565 | .1688 | .1757 | .1831 | 0.2000 |
| Cyanuric Acid (CA) | .0713 | .0435 | .0312 | .0243 | .0169 | 0 |
| Mol ratio of CA to TCCA | 1:1 | 1:2 | 1:3 | 1:4 | 1:6 | 0:1 |
| Sodium Tripolyphosphate | 1 | 1 | 1 | 1 | 1 | 1 |
| Sodium Sulfate | 1 | 1 | 1 | 1 | 1 | 1 |
| Water | 2.5 | 2.5 | 2.5 | 2.5 | 2.5 | 2.5 |
| Percent Loss of Available Chlorine | 3.5 | 1.0 | 12.5 | 23.5 | 35.3 | 43.0 |

The retention of available chlorine in the slurries containing cyanuric acid in contrast to composition 26 from which it was omitted is readily apparent. It is also apparent that a mol ratio of cyanuric acid to trichlorocyanuric acid of 1:2 gives optimum results, but that quite beneficial results are obtained using ¼ to 1 mol of cyanuric acid for every mol of trichlorocyanuric acid.

Example 5

The compositions described in the following table were prepared in the dry mix state after which the compositions were stored for 16 hours in sealed vials at 100° C. and the available chlorine again determined with the following results:

| Composition No. | Trichloro-cyanuric Acid, part | Sodium Carbonate, parts | Melamine, part | Percent Loss in Available Chlorine |
|---|---|---|---|---|
| 27 | 0.2 | 2 | 0 | 35 |
| 28 | 0.2 | 2 | 0.025 | 19.3 |
| 29 | 0.2 | 2 | 0.05 | 12.5 |
| 30 | 0.2 | 2 | 0.1 | 22.3 |

The above results clearly indicate that melamine retards the loss of available chlorine from the compositions under very adverse storage conditions, with the most effective results being obtained using about 0.5 mol of melamine per mol of trichlorocyanuric acid (composition No. 29).

Example 6

The following compositions were prepared, the amounts employed being in parts by weight unless otherwise indicated, and allowed to stand, after which the odor, if any, of the compositions was noted:

| Composition No. | Dimethyl-hydantoin | Trichloro-cyanuric Acid | Sodium Tripoly-phosphate | Water |
|---|---|---|---|---|
| 31 | 0 | 1 | 3 | 10 |
| 32 | 0.5 | 1 | 3 | 10 |
| 33 | 1 | 1 | 3 | 10 |

Composition 31 had a very strong chlorine odor indicating that the trichlorocyanuric acid had at least partially decomposed to form chlorine gas and decomposition products having strong chlorine odors. Compositions 32 and 33, on the other hand, only had a faint chlorine odor indicating that no appreciable decomposition of the trichlorocyanuric acid had occurred. A white precipitate formed in compositions 32 and 33, which result is not obtained with cyanuric acid. The formation of a white precipitate is not desirable when the solution is to be employed for uses where the presence of insoluble materials therein is objectionable.

Example 7

The compositions described in the following table were prepared in the form of a uniform dry mix of solid particles and after which the compositions were stored for 46 hours in sealed vials at 60° C. and the available chlorine again determined with the results given in the following table:

| Ingredients | Composition No. | | | | |
|---|---|---|---|---|---|
| | 34 | 35 | 36 | 37 | 38 |
| Trichlorocyanuric Acid (Parts) | 0.2 | 0.2 | 0.2 | 0.2 | 0.2 |
| Sodium Carbonate (Parts) | 2.0 | 1.95 | 1.9 | 1.95 | 1.9 |
| Dimethyl Hydantoin (Parts) | | 0.05 | 0.1 | | |
| Mixture of Ammelide-Ammeline (Parts) | | | | 0.05 | 0.1 |
| Loss in Available Chlorine Content (Percent of Initial) | 26 | 3.6 | 4.9 | 7.3 | 5.0 |

It is apparent from the above table that dimethyl hydantoin or a mixture of ammeline and ammelide retard the loss of available chlorine from a composition of trichlorocyanuric acid and sodium carbonate under severe storage conditions.

Although the invention described herein has been described primarily with reference to the use of cyanuric acid, it is apparent from the specific examples given that other heterocyclic organic compounds containing N–H linkages can be used instead of cyanuric acid to retard the loss of available chlorine from compositions comprising trichlorocyanuric acid and water-soluble, alkaline alkali metal salts. Thus, it has presently been found that cyanuric acid can be replaced in whole or part by heterocyclic organic compounds having in one tautomeric form the following structural formula:

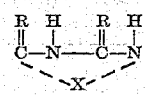

where X is selected from the group consisting of

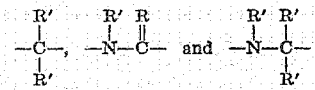

where R is selected from oxygen and NH and R' is selected from hydrogen and alkyl radicals, preferably alkyl radicals containing from 1 to 10 carbon atoms, more particularly methyl groups.

However, it has presently been found that cyanuric acid is more desirable and effective for most purposes than the other organic compounds which fall in the scope of the above formula. Thus, some of such compounds must be used in larger quantities than cyanuric acid, or form precipitates in aqueous media, whereas cyanuric acid does not have these disadvantages. Accordingly, it can be stated that other compounds having the structural formula referred to above are not equivalent to cyanuric acid. Hence, cyanuric acid is definitely preferred over other organic compounds having the above structural formula, but it is to be understood that organic compounds having in one tautomeric form the structural formula given above fall within the scope of the present invention.

As examples of organic compounds which fall within the scope of the above structural formula and which can be used in the compositions of this invention may be mentioned cyanuric acid, ammeline, ammelide, melamine, alkyl guanamines, preferably those having from 1 to 10 carbon atoms as, for example, ethyl and butyl guanamine, α-dimethyl hydantoin, hydantoin, α-methyl hydantoin and the like.

In general, the amount of such compound required to effectively retard the loss of available chlorine from the compositions will vary depending upon the particular organic compound and alkaline salts used and the conditions under which the compositions are to be stored or used. For example, the alkali metal carbonates usually cause a more rapid initial loss of available chlorine from the compositions than other alkaline salts and therefore often require the use of larger amounts of the above organic compounds to retard this loss of available chlorine.

Also, some of the above organic compounds contain N–H linkages in which the hydrogen is not replaced by chlorine as readily as in other compounds falling within the above structural formula and thus may have to be used in larger amounts to provide equivalent effectiveness. Again, in those instances where the storage conditions or conditions of use are usually severe or adverse, it may be necessary to use larger amounts of the above-described organic compounds.

The amounts of cyanuric acid which can be used in the compositions have already been described herein. In the case of the other organic compounds described above, it is usually possible to prepare compositions in which the loss of available chlorine is considerably retarded by using from 0.1 to 1.5, preferably 0.3 to 1, mol of such compounds per mol of trichlorocyanuric acid in the composition.

The compositions of this invention can be prepared in a variety of ways. Thus the ingredients can be and preferably are, mixed as solid particles to provide a mixture, preferably a uniform mixture, of solid particles, usually in the form of a free-flowing mixture. However, the ingredients can be mixed as solid particles and then briquetted or tabletted or otherwise compressed in the form of cakes, cubes, etc. The ingredients can also be dissolved or slurried in water and sold as aqueous slurries or solutions, or these can be dried, for example, by drum drying to obtain flakes which can be used as such or ground to powder form. The aqueous solutions or slurries can also be spray dried in the form of beads or hollow spheres.

What is claimed is:

1. A composition of matter having improved resistance to loss of available chlorine in the presence of moisture and consisting essentially of (1) from about 0.5 to 40% by weight of trichlorocyanuric acid, (2) from about 0.1 to 1.5 mol, per mol of trichlorocyanuric acid, of an organic compound having in one tautomeric form the structural formula:

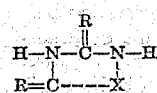

where X is selected from the group consisting of

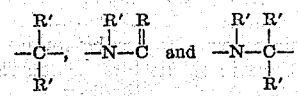

where R is selected from the group consisting of oxygen and NH and R' is selected from the group consisting of hydrogen and alkyl radicals having from 1 to 10 carbon atoms, (3) a water-soluble salt selected from the group consisting of an alkaline, water-soluble alkali metal salt and mixtures thereof with a water-soluble neutral alkali metal salt and (4) moisture in the range of 0.5 to 5% by weight.

2. The composition of claim 1, wherein the alkaline water-soluble salt is an alkali metal phosphate.

3. The composition of claim 1, wherein the water-soluble alkaline salt is sodium carbonate.

4. The composition of claim 2, wherein the phosphate is sodium tripolyphosphate.

5. A composition of matter having improved resistance to loss of available chlorine in the presence of moisture and consisting essentially of (1) from about 0.5 to 40% by weight of trichlorocyanuric acid, (2) from about 0.05 to 10% by weight of an anionic wetting agent, (3) from about 0.3 to 1 mol, per mol of trichlorocyanuric acid, of an organic heterocyclic compound having a tautomeric form of the structural formula:

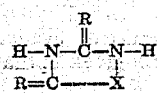

where X is selected from the group consisting of

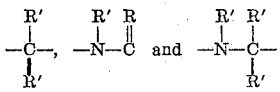

where R is selected from the group consisting of oxygen and NH and R' is selected from the group consisting of hydrogen and alkyl radicals having from 1 to 10 carbon atoms, (4) a water-soluble salt selected from the group consisting of an alkaline, water-soluble alkali metal salt and mixtures thereof with a water-soluble neutral alkali metal salt and (5) moisture in the range of 0.5 to 5% by weight.

6. A composition of matter having improved resistance to loss of available chlorine in the presence of moisture and consisting essentially of from 0.5 to 40% by weight of trichlorocyanuric acid, about 1.0 to 1 mol of cyanuric acid per mol of trichlorocyanuric acid, moisture in the range of 0.5 to 5% by weight and a substance selected from the group consisting of water-soluble, alkaline alkali metal salts and mixtures thereof with water-soluble, neutral, inert alkali metal salts.

7. A composition of matter having improved resistance to loss of available chlorine in the presence of moisture and consisting essentially of (1) from 0.5 to 40% by weight of trichlorocyanuric acid, (2) about 0.1 to 1 mol of cyanuric acid per mol of trichlorocyanuric acid, (3) from about 0.05 to 10% by weight of an anionic synthetic detergent, (4) a water-soluble salt selected from the group consisting of water-soluble, alkaline alkali metal salts and mixtures thereof with water-soluble, neutral, inert, alkali metal salts and (5) moisture in the range of 0.5 to 5% by weight.

8. A composition of matter having improved resistance to loss of available chlorine in the presence of moisture and consisting essentially of moisture in the range of 0.5 to 5% by weight and on a solids basis, (1) from about 3 to 15% by weight of trichlorocyanuric acid, (2) about 0.3 to 0.7 mol of cyanuric acid per mol of trichlorocyanuric acid, (3) about 10 to 60% by weight of sodium tripolyphosphate and (4) sodium sulfate.

9. A composition of matter having improved resistance to loss of available chlorine in the presence of moisture and consisting essentially of moisture in the range of 0.5 to 5% by weight and on a solids basis, (1) about 3 to 15% by weight of trichlorocyanuric acid, (2) about 0.3 to 0.7 mol of cyanuric acid per mol of trichlorocyanuric acid, (3) about 10 to 60% by weight of a mixture of sodium tripolyphosphate and alkali metal silicate, and (4) sodium sulfate.

10. A composition of matter having improved resistance to loss of available chlorine in the presence of moisture and consisting essentially of moisture in the range of 0.5 to 5% by weight and on a solids basis, (1) about 3 to 15% by weight of trichlorocyanuric acid, (2) about 0.3 to 0.7 mol of cyanuric acid per mol of trichlorocyanuric acid, (3) about 10 to 60% by weight of sodium tripolyphosphate, (4) about 0.1 to 5% by weight of an anionic wetting agent and (5) sodium sulfate.

11. A composition of matter having improved resistance to loss of available chlorine in the presence of moisture and consisting essentially of (1) from about 0.5 to 40% by weight of trichlorocyanuric acid, (2) from about 0.1 to 1.5 mol of cyanuric acid per mol of trichlorocyanuric acid, (3) moisture in the range of from 0.5 to 5.0% by weight and (4) an alkali metal carbonate.

12. A composition of matter having improved resistance to loss of available chlorine in the presence of moisture and consisting essentially of moisture in the range of from 0.5 to 5.0% and, on a solids basis, (1) from about 0.5 to 40% by weight of trichlorocyanuric acid, (2) from about 0.3 to 1 mol of alpha-dimethyl hydantoin per mol of trichlorocyanuric acid and (3) a water-soluble, alkaline alkali metal salt.

References Cited in the file of this patent

UNITED STATES PATENTS

| | | |
|---|---|---|
| 1,894,539 | Mirau | Jan. 17, 1933 |
| 2,427,097 | Kamlet | Sept. 9, 1947 |
| 2,430,233 | Magil | Nov. 4, 1947 |
| 2,438,781 | Kamlet | Mar. 30, 1948 |
| 2,578,270 | Strain | Dec. 11, 1951 |
| 2,607,738 | Hardy | Aug. 19, 1952 |